Feb. 28, 1956  S. T. CHICHESTER, JR  2,736,520
HANDLING SYSTEM FOR AIRCRAFT
Filed Oct. 9, 1953
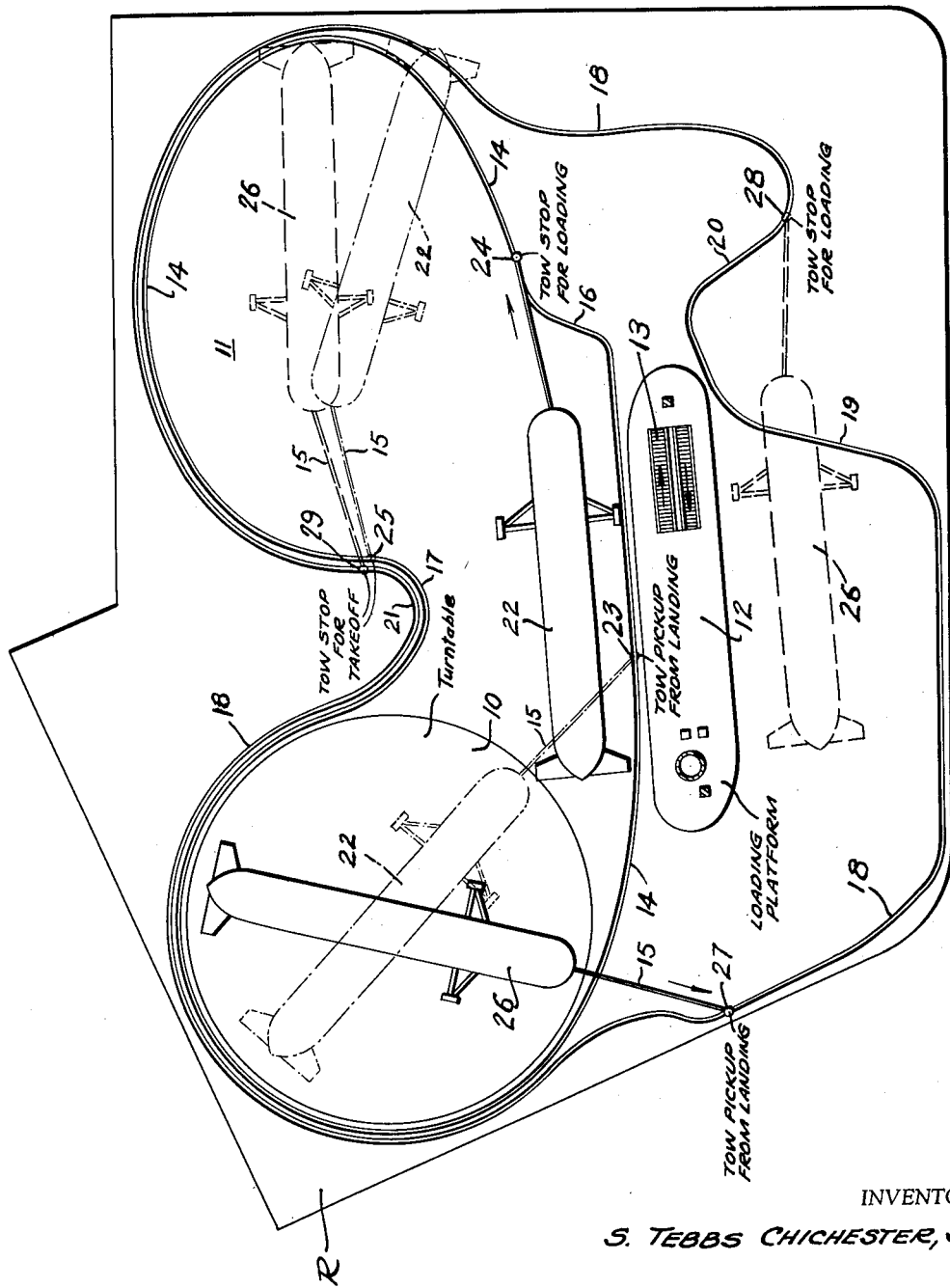
INVENTOR
S. TEBBS CHICHESTER, JR.
BY
ATTORNEY

United States Patent Office

2,736,520
Patented Feb. 28, 1956

2,736,520

HANDLING SYSTEM FOR AIRCRAFT

Sidnor Tebbs Chichester, Jr., Washington, D. C., assignor of one-third to James Perkins Parker, Washington, D. C.

Application October 9, 1953, Serial No. 385,185

6 Claims. (Cl. 244—114)

This invention relates to transportation and more particularly to a system for handling aircraft, such as helicopters during landing, loading and takeoff operations.

During recent years, air transportation has increased to such an extent that larger airports have become necessary and in view of the extremely large land area required for such airports, it has been necessary to locate the same at progressively greater distances from the centers of the cities which they serve. This situation has resulted in a substantial increase in the travel time required to and from airports and in some instances, this has even resulted in ground travel time, equal to or greater than, air travel time.

Obviously, such a situation materially detracts from the prime appeal of air travel, which is speed, and consequently, any solution to the problem of reducing ground travel time represents a very worth while contribution to the art.

With the advent of practical passenger carrying helicopters a possible solution to this problem occurs and it only remains to provide safe and efficient terminal facilities for such helicopters, which may be located centrally of a metropolitan area, thus providing relatively rapid transportation to and from the airport.

In these days of relatively tall buildings, it becomes necessary to substantially eliminate such buildings as hazards and consequently, it appears desirable to locate the helicopter terminal on the roof of a relatively tall building and as remote as possible from other taller buildings. Due to the peculiar landing and takeoff characteristics of helicopters, it is however, possible to provide a perfectly safe terminal which may be partially obstructed on one or two sides and substantially unobstructed on the other sides.

Since, rooftops provide a relatively small area and further, since it is necessary to handle arriving and departing aircraft, such as helicopters at a relatively rapid rate, obviously some means must be provided for rapidly moving such helicopters from a landing station to a loading station and thereafter to a takeoff area, and at the same time, to properly orient the helicopters for takeoffs. It is also highly desirable, that the aicraft be handled by power means other than the motive power of such aircraft.

It is accordingly an object of this invention to provide a system for handling aircraft during landing, loading and takeoff operations, such system including a rooftop installation suitable for areas partially obstructed by adjoining or adjacent buildings.

A further object of the invention is the provision of a system for handling aircraft during landing, loading and takeoff operations including a rooftop installation having means for orienting aircraft, such as helicopters, after landing and means for automatically moving such aircraft to a loading platform and thereafter to a takeoff area where such aircraft are properly oriented for takeoff.

A still further object of the invention is the provision of a system for handling aircraft during landing, loading and takeoff operations, including a rooftop installation having automatic means for alternately moving landing aircraft to one side or the other of a loading platform and thereafter, to a takeoff area, thereby materially increasing the volume of traffic which it is possible to handle.

Another object of the invention is the provision of a system for handling aircraft during landing, loading and takeoff operations including a rooftop installation and mechanical means for moving and handling aircraft thereon, the only manual operations required being coupling and uncoupling of the aircraft to a towing means for moving the same.

Further objects and advantages of the invention will be apparent from the following description taken in conjunction with the accompanying drawing wherein:

The single figure is a top plan diagrammatic view of a rooftop aircraft terminal incorporating the aircraft handling system of this invention.

With continued reference to the drawing there is shown a rooftop R for receiving the aircraft terminal and handling equipment of this invention and it is to be understood, that the particular shape of the roof shown, is for purposes of illustration only, since the design of the terminal and equipment is adapted to many different roof outlines and may be so installed as to eliminate adjoining or adjacent taller buildings as flight hazards.

As shown, a turntable 10 of sufficient size to directly receive landing aircraft provides a landing station and turntable 10 may be rotated by any suitable mechanical means under control of an operator located in a control tower, from which there is uninterrupted vision of the entire terminal. Located to one side of the turntable 10 is a takeoff area 11 and this is of sufficient size to permit turning and proper takeoff of the aircraft, such as helicopters, in a predetermined direction, free of obstructions such as adjacent tall buildings. Located between and to one side of the turntable 10 and takeoff area 11 is a loading platform 12 which is of sufficient size to accommodate passengers and baggage and which may be served by escalators or stairways 13 from the lower floors of the building. Of course, if desired, elevators may be installed to serve the loading platform 12 directly from the street level.

Surrounding the turntable 10 comprising the landing station and the takeoff area 11 is an endless trackway 14 which passes inwardly of the loading platform 12. Trackway 14 serves to mount a tow means, not specifically shown, which is adapted to be coupled to an aircraft by a tow bar or other suitable means 15. It is to be noted, that trackway 14 is provided with an offset 16 adjacent one end of the loading platform 12 and with a reentrant bend 17 between the turntable 10 and the takeoff area 11. The purpose of the offset 16 and reentrant bend 17 will be presently described.

A second endless trackway 18 extends around the landing station and takeoff area substantially parallel to the trackway 14, but trackway 18 passes the loading platform 12 on the opposite side from the trackway 14. It is to be noted, that trackway 18 is provided with a portion 19 extending toward the loading platform 12 and an offset portion 20 extending outwardly and away from the loading platform 12. Trackway 18 is also provided with a reentrant bend 21 in the same location as the reentrant bend 17 in the trackway 14.

In operation, it may be assumed, that an aircraft, such as a helicopter 22 has landed on the turntable 10 and such turntable, may be rotated until the aircraft 22 may be conveniently coupled by tow bar 15 to the towing means on trackway 14 at a point 23. At this time, the tow means will be actuated to move the aircraft 22 toward the loading platform 12 and since, the tow means will follow the offset 16 in the trackway 14, this will bring the aircraft 22 into parallel relationship with the loading platform 12 at the inner side thereof. The tow means is stopped at point 24 for loading and unloading of passengers and baggage. Upon completing the loading of aircraft 22, the tow means is again operated at which time, the aircraft 22 is moved to the landing area 11 and due to the curvature of the track 14 and the reentrant bend 17, the aircraft 22 is properly oriented for takeoff as shown in dot-dash lines. The tow means is stopped at point 25 and the tow bar 15 uncoupled from the aircraft 22.

Since, high speed operation and handling of aircraft is necessary in order to accommodate a sufficient volume of traffic, the installation contemplates the landing of a second aircraft 26 while the first aircraft 22 is discharging and loading passengers at the loading platform 12. As will be seen from an inspection of the drawing, the aircraft 26 lands on the turntable 10 and is moved to a proper position for attaching a tow bar 15 to couple the aircraft 26 to the towing means on track 18 at point 27. Operation of the tow means on track 18 serves to move the aircraft from the turntable 10 and to a position outside of the loading platform 12. The track portion 19 and the offset track portion 20 serve to position the aircraft 26 substantially parallel to the loading platform 12 and on the opposite side from the aircraft 22. The tow means on track 18 stops at point 28 during discharging and loading operations.

Upon completion of loading of aircraft 26 the tow means on trackway 18 is again operated to move the aircraft 26 to the takeoff area 11 and the same is properly oriented for takeoff as shown in dash lines. The tow means is stopped at point 29 to permit uncoupling of the tow bar 15.

The aircraft handling system of this invention has been described with reference to a single landing, loading and takeoff installation utilizing dual tow means in order to handle aircraft in rapid succession. Obviously, if desired, duplicate installations may be provided as volume of traffic requires and these installations may be situated on the same roof top if sufficient area is available. While dual tow means is shown and described obviously, if desired, only a single tow means may be utilized and the loading platform may be positioned to receive aircraft on either side. Furthermore, if necessary or desirable, a turntable may be provided at the takeoff area to assist in proper orientation of the aircraft for takeoff. As shown in the drawing the tow tracks are so arranged that the aircraft follow entirely separate paths and consequently any danger of collision or fouling is eliminated.

This completes a description of the structure and operation of the aircraft handling system of this invention and it will be seen, that aircraft such as helicopters, may land, discharge, load and takeoff in rapid succession with a minimum of manual effort. It will also be seen, that the system of this invention permits proper orientation of the aircraft upon landing to permit convenient coupling of the same to the tow means and also, automatically orients the aircraft for takeoff in order to avoid adjacent tall buildings or other hazards. The installation is relatively simple and may be adapted to a rooftop of almost any configuration, which provides sufficient area for the intended operations.

It will be obvious to those skilled in the art, that various changes may be made in the invention, without departing from the spirit and scope thereof and therefore, the invention is not limited by that which is shown in the drawings and described in the specification, but only as indicated in the appended claims.

What is claimed is:

1. In a system for handling aircraft during landing, loading and takeoff operations, a landing station comprising a turntable for orienting an aircraft landing thereon, a takeoff area, a loading platform located substantially midway between said landing station and said takeoff area and to one side thereof, an endless trackway extending around said takeoff area and said landing station and passing inwardly of said loading platform, tow means carried by said trackway, a second endless trackway extending around said takeoff area and said landing station and passing outwardly of said loading platform, a second tow means carried by said second trackway, means for detachably coupling an aircraft to either of said tow means whereby an aircraft landing on said turntable may be oriented and coupled to either of said tow means and said tow means operated to move said aircraft into position opposite said loading platform and upon further operation of said tow means to move said aircraft into said takeoff area, the configuration of said first trackway being such as to position said aircraft substantially parallel to said loading platform on the inner side thereof and to orient said aircraft in said takeoff area in proper position for takeoff and the configuration of said second trackway being such as to position said aircraft substantially parallel to said loading platform on the outer side thereof and to orient said aircraft in said takeoff area in proper position for takeoff.

2. In a system for handling aircraft during landing, loading and takeoff operations, a landing station comprising a turntable for orienting an aircraft landing thereon, a takeoff area, a loading platform located between said landing station and said takeoff area and to one side thereof, an endless trackway extending around said takeoff area and said landing station and passing inwardly of said loading platform, tow means carried by said trackway, a second endless trackway extending around said takeoff area and said landing station and passing outwardly of said loading platform, a second tow means carried by said second trackway, means for detachably coupling an aircraft to either of said tow means whereby an aircraft landing on said turnable may be oriented and coupled to either of said tow means and said tow means operated to move said aircraft into position opposite said loading platform and upon further operation of said tow means to move said aircraft into said takeoff area, the configuration of said first trackway being such as to position said aircraft substantially parallel to said loading platform on the inner side thereof and to orient said aircraft in said takeoff area in proper position for takeoff and the configuration of said second trackway being such as to position said aircraft substantially parallel to said loading platform on the outer side thereof and to orient said aircraft in said takeoff area in proper position for takeoff.

3. In a system for handling aircraft during landing, loading and takeoff operations, a landing station comprising a turntable for orienting an aircraft landing thereon, a takeoff area, a loading platform located between said landing station and said takeoff area and to one side of a line between the centers thereof, a trackway extending around the major portion of said takeoff area and around the major portion of said landing station and passing inwardly of said loading platform, tow means carried by said trackway, a second trackway extending around a portion of said takeoff area and a portion of said landing station and passing outwardly of said loading platform, said first and second trackways having parallel portions around said landing station, a second tow means carried by said second trackway, means for detachably coupling an aircraft to either of said tow means whereby an aircraft landing on said turntable may be oriented and coupled to either of said tow means and said tow means operated to move said aircraft into position opposite said loading platform and upon further operation of said tow means to move said aircraft into said takeoff area, the configuration of said first trackway being such as to position said aircraft substantially parallel to said loading platform on the inner side thereof and to orient said aircraft in said takeoff area in proper position for takeoff and the configuration of said second trackway being such as to position said aircraft substantially parallel to said loading platform on the outer side thereof and to orient said aircraft in said takeoff area in proper position for takeoff.

4. In a system for handling aircraft during landing, loading and takeoff operations, a landing station comprising a turntable for orienting an aircraft landing thereon, a takeoff area, a loading platform located between said landing station and said takeoff area, a trackway extending around the major portion of said takeoff area and around the major portion of said landing station and passing inwardly of said loading platform, two means carried by said trackway, a second trackway extending in parallel relationship to said first trackway around said takeoff area and said landing station and passing outwardly of said loading platform, a second tow means carried by said second trackway, means for detachably coupling an aircraft to either of said tow means whereby an aircraft landing on said turntable may be oriented and coupled to either of said tow means and said tow means operated to move said aircraft into position opposite said loading platform and upon further operation of said tow means to move said aircraft into said takeoff area, the configuration of said first trackway being such as to position said aircraft substantially parallel to said loading platform on the outer side thereof and to orient said aircraft in said takeoff area in proper position for takeoff.

5. In a system for handling aircraft during landing, loading and takeoff operations, a landing station, a takeoff area, a loading platform located between said landing station and said takeoff area, a trackway extending around the major portion of said takeoff area and around the major portion of said landing station and passing inwardly of said loading platform, tow means carried by said trackway, a second trackway extending in parallel relationship to said first trackway around said takeoff area and in parallel relationship to said first trackway said landing station and passing outwardly of said loading platform, a second tow means carried by said second trackway, means for detachably coupling an aircraft to either of said tow means whereby an aircraft at said landing station may be coupled to either of said tow means and said tow means operated to move said aircraft into position opposite said loading platform and upon further operation of said tow means to move said aircraft into said takeoff area, the configuration of said first trackway being such as to position said aircraft substantially parallel to said loading platform on the outer side thereof and to orient said aircraft in said takeoff area in proper position for takeoff.

6. In a system for handling aircraft during landing, loading and takoff operations, a landing station, a takeoff area, a loading platform located at one side of a line between the centers of said landing station and said takeoff area, a trackway extending around the major portion of said takeoff area and around the major portion of said landing station and passing said loading platform, tow means carried by said trackway and means for detachably coupling an aircraft to said tow means whereby an aircraft at said landing station may be coupled to said tow means and said tow means operated to move said aircraft into position opposite said loading platform and upon further operation of said tow means to move said aircraft into said takeoff area, the configuration of said trackway being such as to position said aircraft substantially parallel to said loading platform and to orient said aircraft in said takeoff area in proper position for takeoff.

References Cited in the file of this patent

UNITED STATES PATENTS

| | | |
|---|---|---|
| 1,465,246 | Lemm | Aug. 14, 1923 |
| 1,843,640 | Jackson | Feb. 2, 1932 |
| 1,997,945 | Olaszy | Apr. 16, 1935 |
| 2,542,847 | Turnbull | Feb. 20, 1951 |

FOREIGN PATENTS

| | | |
|---|---|---|
| 49,706 | Austria | Sept. 11, 1911 |
| 994,923 | France | Aug. 14, 1951 |